(12) United States Patent
Grard et al.

(10) Patent No.: US 11,958,401 B2
(45) Date of Patent: Apr. 16, 2024

(54) LIGHT ELEMENT OF A VEHICLE

(71) Applicant: VALEO VISION, Bobigny (FR)

(72) Inventors: Christophe Grard, Bobigny (FR);
Pierre Renaud, Bobigny (FR);
Gregory Planche, Bobigny (FR)

(73) Assignee: Valeo Vision, Bogigny (FR)

( * ) Notice: Subject to any disclaimer, the term of this patent is extended or adjusted under 35 U.S.C. 154(b) by 0 days.

(21) Appl. No.: 17/785,734

(22) PCT Filed: Dec. 15, 2020

(86) PCT No.: PCT/EP2020/086158
§ 371 (c)(1),
(2) Date: Jun. 15, 2022

(87) PCT Pub. No.: WO2021/122554
PCT Pub. Date: Jun. 24, 2021

(65) Prior Publication Data
US 2023/0051331 A1 Feb. 16, 2023

(30) Foreign Application Priority Data
Dec. 19, 2019 (FR) ...................................... 1914899

(51) Int. Cl.
*B60Q 1/00* (2006.01)
*F21S 41/24* (2018.01)
(Continued)

(52) U.S. Cl.
CPC .......... *B60Q 1/0023* (2013.01); *B60Q 1/0011* (2013.01); *F21S 41/24* (2018.01);
(Continued)

(58) Field of Classification Search
CPC ..... B60Q 1/0023; B60Q 1/0011; F21S 41/24; F21S 41/37; F21S 41/40; F21S 43/33; F21S 43/249; F21S 43/245; F21S 43/26
See application file for complete search history.

(56) References Cited

U.S. PATENT DOCUMENTS 10,168,039 B2   1/2019   Dellock et al.
10,974,661 B2   4/2021   Okumura et al.
(Continued)

FOREIGN PATENT DOCUMENTS

CN   103867980 A   6/2014
CN   106427819 A   2/2017
(Continued)

OTHER PUBLICATIONS

European Patent Office, International Search Report and Written Opinion of corresponding International Application No. PCT/EP2020/086158, dated Jan. 19, 2021.
(Continued)

*Primary Examiner* — Christopher E Dunay
(74) *Attorney, Agent, or Firm* — Valeo Vision

(57) ABSTRACT

The invention relates to a light element of a vehicle with at least one light source configured to emit light rays, a reflective layer. With a pattern made wholly or partly in the reflective layer. The light element further including an optical element configured to project the light rays from the at least one light source towards the reflective layer. With a dark layer extending along the optical element on the side opposite the reflective layer.

15 Claims, 10 Drawing Sheets

(51) Int. Cl.
  *F21S 41/37*  (2018.01)
  *F21S 41/40*  (2018.01)
  *F21S 43/20*  (2018.01)
  *F21S 43/245*  (2018.01)
  *F21S 43/249*  (2018.01)
  *F21S 43/33*  (2018.01)
  *F21W 107/10*  (2018.01)

(52) U.S. Cl.
  CPC .............. *F21S 41/37* (2018.01); *F21S 41/40* (2018.01); *F21S 43/245* (2018.01); *F21S 43/249* (2018.01); *F21S 43/26* (2018.01); *F21S 43/33* (2018.01); *F21W 2107/10* (2018.01)

(56) References Cited

U.S. PATENT DOCUMENTS

| | | | |
|---|---|---|---|
| 2015/0167917 A1 | 6/2015 | Takahashi et al. | |
| 2016/0280128 A1* | 9/2016 | Cannon | B60Q 3/16 |
| 2019/0100159 A1* | 4/2019 | Schöne | F21S 43/245 |
| 2019/0103042 A1 | 4/2019 | Schöne et al. | |
| 2019/0356046 A1 | 11/2019 | Mayer Pujadas et al. | |
| 2020/0217477 A1* | 7/2020 | Nicholson | F21S 43/31 |
| 2020/0386381 A1* | 12/2020 | Aizawa | F21S 43/50 |
| 2021/0023979 A1* | 1/2021 | Dellock | B60R 13/005 |
| 2022/0048444 A1* | 2/2022 | Mayer Pujadas | F21S 41/50 |
| 2022/0308206 A1* | 9/2022 | Hirano | G01S 7/027 |
| 2022/0357021 A1* | 11/2022 | Paule | B29C 45/16 |

FOREIGN PATENT DOCUMENTS

| | | |
|---|---|---|
| CN | 109649289 A | 4/2019 |
| CN | 109844559 A | 6/2019 |
| DE | 102017214129 A1 | 2/2019 |
| DE | 102018111438 A1 | 11/2019 |
| JP | 2014070899 A | 4/2014 |
| WO | 2019038108 A1 | 2/2019 |

OTHER PUBLICATIONS

Chine Patent Office, Office Action of corresponding Chinese Patent Application No. 202080089006.4, dated Jan. 25, 2024.

\* cited by examiner

LIGHT ELEMENT OF A VEHICLE

CROSS-REFERENCE TO RELATED APPLICATIONS

This application is filed under 35 U.S.C. § 371 U.S. National Phase of International Application No. PCT/EP2020/086158 filed Dec. 15, 2020 (published as WO2021122554), which claims priority benefit to French application No. 1914899 filed on Dec. 19, 2019, the disclosures of which are herein incorporated by reference in their entirety.

TECHNICAL FIELD

The present invention relates to a lighting element for a vehicle. It is applied in particular, but without limitation, in motor vehicles.

BACKGROUND OF THE INVENTION

In the field of motor vehicles, a lighting element for a vehicle known to those skilled in the art comprises at least one light source and a metallized reflective layer in which there is formed a pattern that is illuminated by said at least one light source. The metallized reflective layer is formed of indium.

BRIEF SUMMARY OF THE INVENTION

One drawback of this prior art is that, when this lighting element interacts with a radar that is located behind said lighting element, the metallized reflective layer of said lighting element blocks the passage of radar waves. To allow the radar waves to pass, it is necessary to have a metallized reflective layer of very thin thickness, of the order of a nanometer. However, in this case, the metallized reflective layer is translucent and loses its mirror effect.

In this context, the present invention aims to propose a lighting element for a vehicle that makes it possible to solve the mentioned drawback.

To this end, the invention proposes a lighting element for a vehicle, said lighting element comprising:
 at least one light source configured so as to emit light rays,
 a reflective layer,
 characterized in that a pattern is produced fully or partly in said reflective layer, and in that said lighting element furthermore comprises:
  an optical element configured so as to project the light rays from said at least one light source in the direction of the reflective layer,
  a dark layer that extends along said optical element on a side opposite said reflective layer.

According to some non-limiting embodiments, said lighting element may furthermore comprise one or more additional features taken on their own or in any technically possible combinations from among the following.

According to one non-limiting embodiment, said lighting element furthermore comprises a graining.

According to one non-limiting embodiment, said graining is produced on said dark layer.

According to one non-limiting embodiment, said graining is produced on said optical element.

According to one non-limiting embodiment, said optical element is a light guide or is formed of prisms, or is formed of prisms and micro-prisms.

According to one non-limiting embodiment, said dark layer is semi-opaque or opaque.

According to one non-limiting embodiment, said reflective layer is made of indium, silicon oxide or titanium.

According to one non-limiting embodiment, said reflective layer comprises a thickness of the order of a nanometer.

According to one non-limiting embodiment, said pattern is:
 produced by laser etching in the reflective layer,
 formed fully or partly by the reflective layer.

According to one non-limiting embodiment, said lighting element comprises two light sources.

According to one non-limiting embodiment, said two light sources are arranged on either side of said optical element.

According to one non-limiting embodiment, said two light sources are arranged facing the dark layer on a side opposite the reflective layer.

According to one non-limiting embodiment, said pattern is a logo.

According to one non-limiting embodiment, said optical element is separated from the dark layer by a primary medium with a refractive index lower than its own.

According to one non-limiting embodiment, said optical element is separated from the reflective layer by a secondary medium with a refractive index lower than its own.

According to one non-limiting embodiment, the primary medium and the secondary medium are one and the same medium.

According to one non-limiting embodiment, said primary medium and said secondary medium are air.

According to one non-limiting embodiment, said dark layer is arranged facing a radar configured so as to emit radar waves, said radar waves passing through the reflective layer.

According to one non-limiting embodiment, said two light sources are arranged on either side of the radar.

What is furthermore proposed is a lighting assembly for a vehicle comprising a lighting element according to one of the preceding features and a radar arranged facing the dark layer of said lighting element, said reflective layer of said lighting element allowing the radar waves to pass.

What is furthermore proposed is a lighting device comprising a lighting assembly according to the preceding feature.

According to one non-limiting embodiment, the lighting device is a vehicle headlight or a vehicle tail light.

BRIEF DESCRIPTION OF THE DRAWINGS

The invention and its various applications will be better understood upon reading the following description and upon examining the accompanying figures.

DETAILED DESCRIPTION OF THE INVENTION

Figure 1:
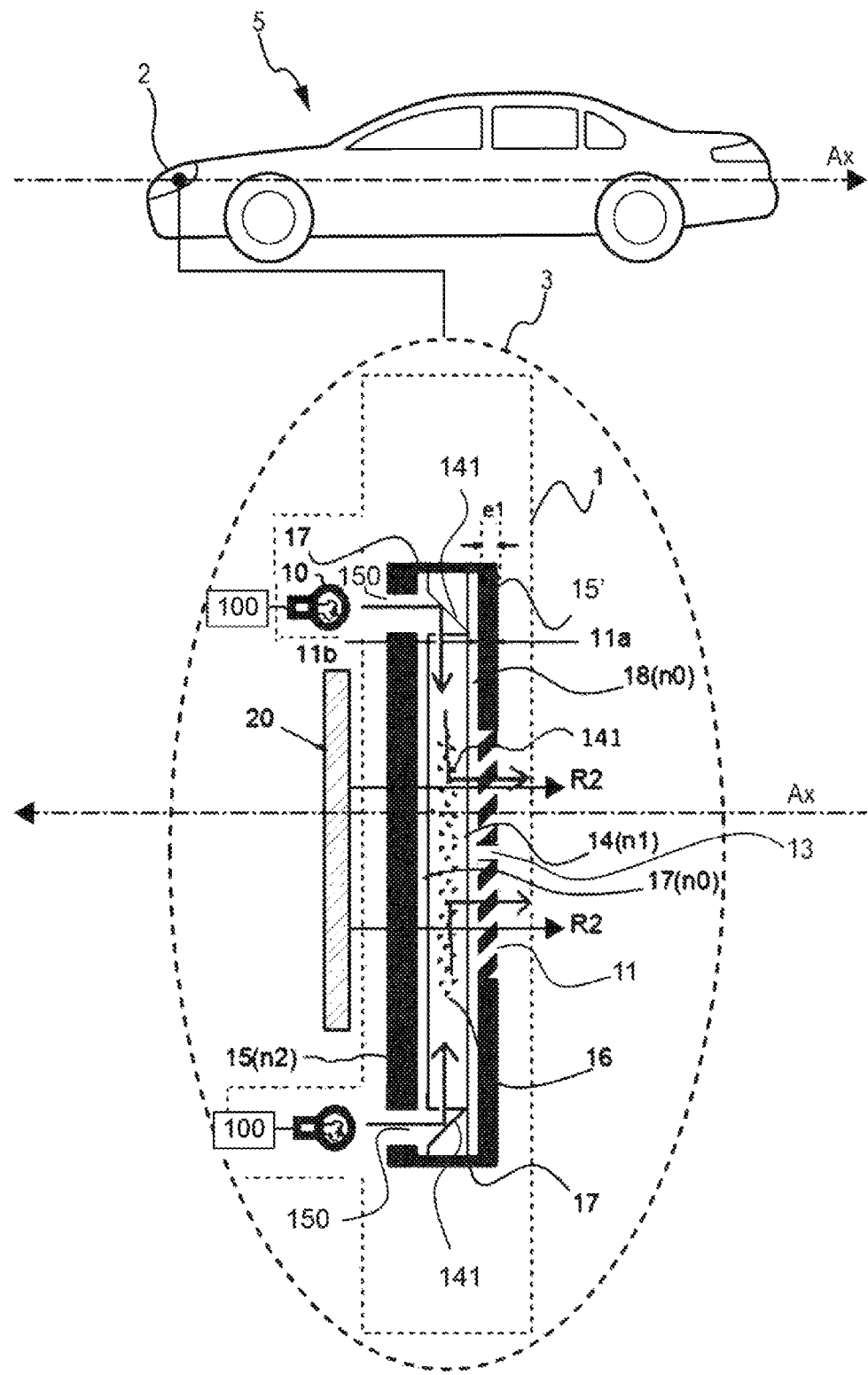
FIG. 1 is a schematic profile view of a lighting element comprising at least one light source, a reflective layer in which a pattern is formed, an optical element, and a dark layer, when said at least one light source is turned on, according to a first non-limiting embodiment of the invention.

Elements that are identical, in structure or in function, and that appear in various figures keep the same reference signs, unless specified otherwise.

The lighting element 1 for a vehicle 5 according to the invention is described with reference to FIGS. 1 to 10. In one non-limiting embodiment, the vehicle 5 is a motor vehicle. The term motor vehicle is understood to mean any type of motorized vehicle. This embodiment is taken as a non-limiting example throughout the remainder of the description. Throughout the remainder of the description, the vehicle 5 is thus otherwise called motor vehicle 5.

As illustrated in FIGS. 1 to 6, the lighting element 1 of a motor vehicle 5 comprises:
  at least one light source 10,
  a reflective layer 11,
  a pattern 13 (illustrated in FIGS. 7a to 7d) produced fully or partly in the reflective layer 11,
  an optical element 14, and
  a dark layer 15.

In one non-limiting embodiment, the lighting element 1 furthermore comprises a counterpart 17 configured so as to hold the reflective layer 11, the optical element 14 and the dark layer 15 together. In one illustrated non-limiting example, the counterpart 17 holds them together at each of their ends.

In one non-limiting embodiment, the lighting element 1 forms part of a lighting device 2 of the motor vehicle 5. In one non-limiting embodiment, the lighting device 2 is a headlight of the motor vehicle 5 or a tail light of the motor vehicle 5. In another non-limiting embodiment, the lighting element 1 may form part of the grille of the motor vehicle 5 or be integrated into the rear of the motor vehicle 5.

In one non-limiting embodiment illustrated in FIGS. 1 to 6, the lighting device 2 furthermore comprises a radar 20 that interacts with the lighting element 1. In one non-limiting embodiment, the radar 20 is a radar for detecting objects (pedestrian, bicycle, vehicle, etc.) that move in the environment of the motor vehicle 5. The radar 20 generates radar waves R2 that will pass through said lighting element 1. In one non-limiting embodiment, the radar 20 operates at a radar frequency of between 1 GHz and 30 THz. In one non-limiting variant embodiment, the radar 20 operates at a radar frequency of between 76 GHz and 81 GHz. In one non-limiting embodiment, the radar 20 is arranged in a manner centered on the lighting element 1, facing the dark layer 15. It is arranged behind the lighting element 1 along a through-axis Ax of the motor vehicle 5 that passes through the lighting element 1, said axis Ax extending in a direction opposite to the movement of the motor vehicle 5. In particular, in this opposite direction, the radar 20 is arranged behind the pattern 13 on a side of the dark layer 15 opposite the side 15a (illustrated in FIG. 8a) where the light guide 14 is located. It thus faces the side 15b (illustrated in FIG. 8a) of the dark layer 15. In one non-limiting embodiment, the radar 20 is fixed to the lighting element 1. In one non-limiting example, it is attached by way of fixing clips (not illustrated). The lighting element 1 and the radar 20 form a lighting assembly 3.

Said at least one light source 10 is described below.

In one non-limiting embodiment, said at least one light source 10 is a semiconductor light source. In one non-limiting embodiment, said semiconductor light source forms part of a light-emitting diode. A light-emitting diode is understood to mean any type of light-emitting diode, be these, in non-limiting examples, LEDs ("Light Emitting Diodes"), OLEDs ("organic LEDs"), AMOLEDs (Active-Matrix-Organic LEDs) or even FOLEDs (Flexible OLEDs). In another non-limiting embodiment, said at least one light source 10 is a bulb with a filament.

The light source 10 is configured so as to emit light rays R1. In one non-limiting embodiment illustrated in FIGS. 1 to 6, the lighting element 1 comprises two light sources 10. This non-limiting embodiment is taken as a non-limiting example throughout the remainder of the description.

Figure 2:
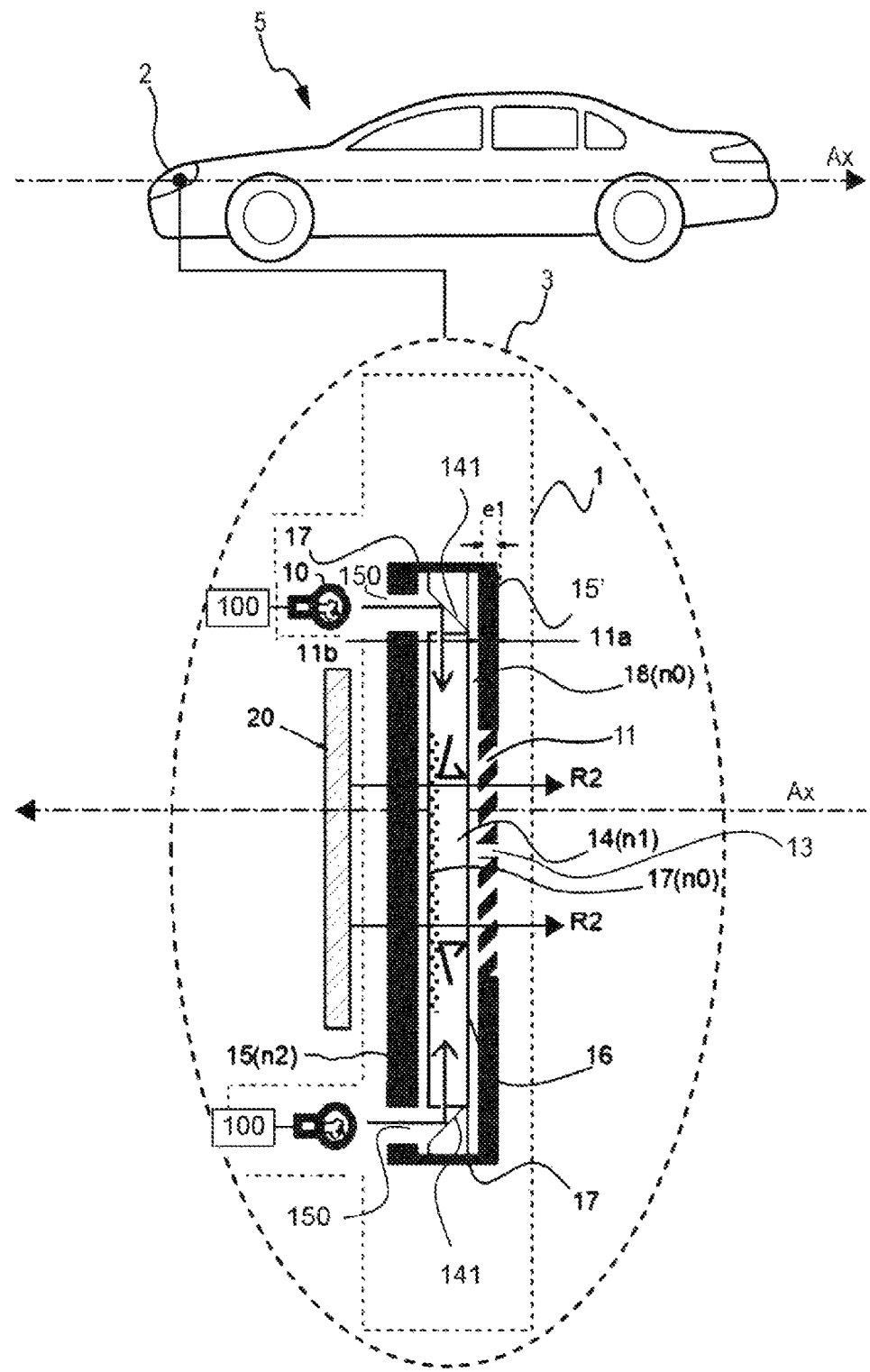
FIG. 2 is a schematic profile view of a lighting element comprising at least one light source, a reflective layer in which a pattern is formed, an optical element, and a dark layer, when said at least one light source is turned on, according to a second non-limiting embodiment of the invention.

In a first non-limiting embodiment illustrated in FIG. 1 and FIG. 2, the two light sources 10 and their associated electronics 100 are arranged facing the dark layer 15 on a side opposite the reflective layer 11. They are thus arranged on the side 15b of the dark layer 15 opposite the side 15a. Thus, along the through-axis Ax, they are arranged behind the pattern 13. The emitted light rays R1 thus come from behind the pattern 13. When there is a radar 20, as illustrated in FIG. 1 and FIG. 2, the light sources 10 and their associated electronics 100 (wire, circuit, cables, etc.) are arranged on either side of the radar 20. This first embodiment is beneficial if there is no space on either side of the optical element 14. In this case, the optical element 14 comprises angular cutouts configured so as to deflect the light rays R1 from the two light sources 10 and orient them along an axis perpendicular to the through-axis Ax of the motor vehicle 5. The same applies to the optical element 14 from FIG. 2. The light rays R1 may thus be directed toward the pattern 13 so as to illuminate it.

In a second non-limiting embodiment illustrated in FIGS. 3 to 6, the two light sources 10 and their associated electronics 100 are arranged on either side of the optical element 14. They are in particular arranged facing each end 140 (illustrated in FIG. 8b) of the optical element 14. They are thus not arranged in a manner centered with respect to the lighting element 1, such that they do not interfere with the operation of the radar 20. They are not located behind the pattern 13, but they are offset with respect to the lighting element 1 and therefore to its various layers. They are located on the sides of the pattern 13. There is thus a gain in terms of thickness for the lighting assembly 3 formed by the lighting element 1 and the radar 20. This second non-limiting embodiment is more efficient than the first non-limiting embodiment since it exhibits less loss in terms of brightness. Specifically, there is less redirection of the light rays R1 than in the case of the first non-limiting embodiment.

The reflective layer 11 is described below.

The reflective layer 11 is a layer visible from one side 11a to an observer from outside the motor vehicle 5. It is a light-reflecting layer. It makes it possible to obtain a mirror effect. In some non-limiting embodiments, the reflective layer 11 is made of indium, silicon oxide, titanium or any other reflective material. It is formed of a stack of layers of indium, layers of silicon oxide or of titanium in the non-limiting examples taken. The stack of layers of indium, of silicon oxide or of titanium makes it possible to obtain a reflective layer 11 that allows visible waves to pass, specifically the light rays R1 from the two light sources 10. It should be noted that, when indium is used, the reflective layer 11 has a metallized appearance. When silicon oxide is used, the reflective layer 11 may have a pearlescent appearance. Finally, when titanium is used, the reflective layer 11 may have a metallized appearance.

Moreover, these materials make it possible to produce a reflective layer 11 that is thin enough for the radar waves R2 from the radar 20 to be able to pass through this reflective layer 11. The reflective layer 11 thus comprises a thickness e1 that is thin enough to be transparent to the radar waves R2, in other words to allow the radar waves R2 to pass. In one non-limiting embodiment, the reflective layer 11 comprises a thickness e1 of the order of a nanometer. It should be noted that the thickness e1 is markedly less than the thickness of the skin effect of the material used for the reflective layer 11, when this material is metal. In a first non-limiting variant embodiment, when the reflective layer 11 is made of indium, its thickness e1 is between 10 nm and 150 nm. In a second non-limiting variant embodiment, when the reflective layer 11 is made of silicon oxide, its thickness e1 is between 50 nm and 400 nm. It should be noted that this thin thickness e1 means that the reflective layer 11 could appear translucent. However, by virtue of the dark layer 15, this is not the case when the two light sources 10 are turned off. A reflective appearance is obtained, like a mirror when the two light sources 10 are turned off. Without the dark layer 15, there would be a superposition of two reflections of the light coming from the outside, which is reflected firstly off the reflective layer 11 and secondly off another layer behind the reflective layer 11, for example a colored layer, which would give the effect of translucency. When the dark layer 15 is used, the second reflection of the light coming from the outside is absorbed by this dark layer, and only the first reflection off the reflective layer 11 is visible, thereby giving the mirror effect.

In a first non-limiting embodiment illustrated in FIG. 1 and FIG. 2, the reflective layer 11 is surrounded on either side by an additional dark layer 15'. The reflective layer 11 extends only partially along the dark layer 15. It is thus of shorter length than the dark layer 15.

In a second non-limiting embodiment illustrated in FIGS. 3 to 6, the reflective layer 11 extends completely along the dark layer 15. It is thus approximately of the same length as the dark layer 15.

The pattern 13 is described below.

The pattern 13 is produced fully or partly in the reflective layer 11. It is produced by laser etching or formed fully or partly by the reflective layer 11.

Figure 7A:
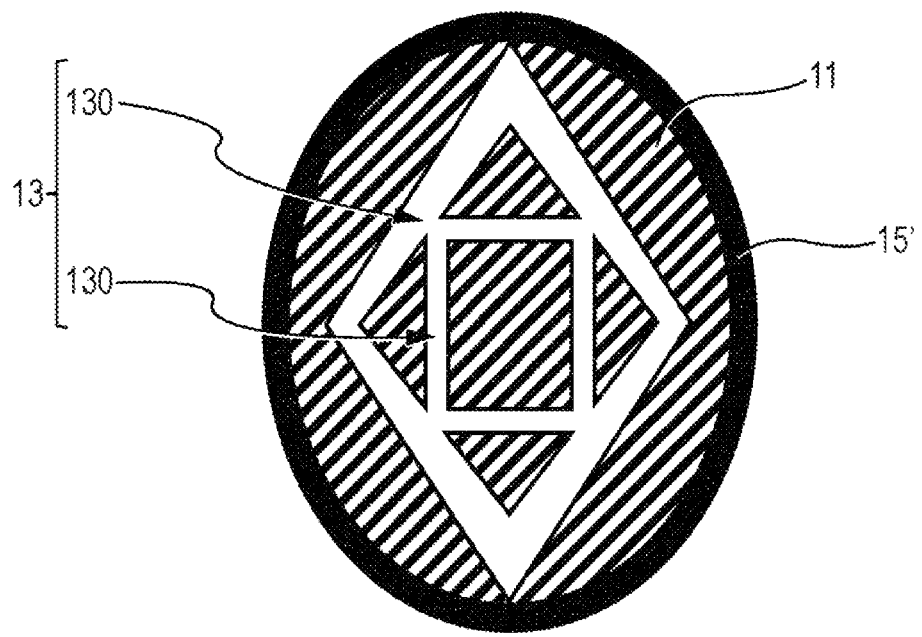
FIG. 7a illustrates a schematic view of a pattern produced in the reflective layer of said lighting element from FIG. 1 or FIG. 2, according to a first non-limiting embodiment.
Figure 7B:
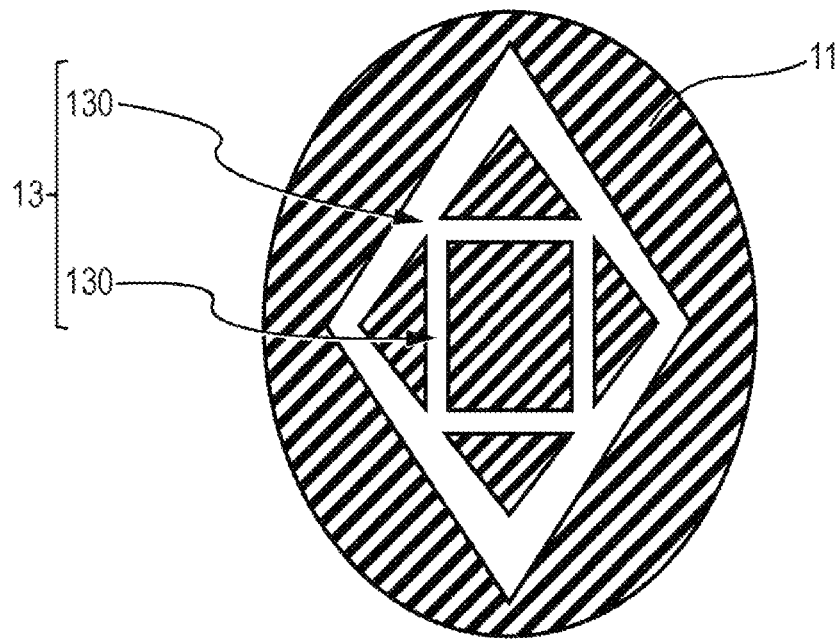
FIG. 7b illustrates a schematic view of a pattern produced in the reflective layer of said lighting element from FIG. 3 or FIG. 5, according to a second non-limiting embodiment.

Thus, in a first non-limiting embodiment illustrated in FIGS. 7a and 7b, the pattern 13 is produced by laser etching in the reflective layer 11. This thus gives a pattern 13 cut out by laser etching. As illustrated in the figures, regions 130 are cut out by laser etching in the reflective layer 11, otherwise called cut-out regions 130. They allow the light rays R1 from the light sources 10 to pass. These are thus regions for the passage of light. These cut-out regions 130 define the contours of the pattern 13. The laser etching thus makes it possible to define the contours of the pattern 13, and thus the regions to be illuminated. The pattern 13 makes it possible to have a lighting device 2 with a light signature when the two light sources 10 are turned on. In one non-limiting embodiment, the pattern 13 is a logo. The signature is thus the logo of the manufacturer of the motor vehicle 5 in one non-limiting example. FIG. 7a illustrates one non-limiting embodiment according to which the pattern 13 is completely integrated into the reflective layer 11 and according to which the reflective layer 11 is surrounded by an additional opaque layer 15'. FIG. 7b illustrates one non-limiting embodiment according to which the pattern 13 is completely integrated into the reflective layer 11 and according to which the reflective layer 11 is not surrounded by an additional opaque layer 15'.

In one non-limiting variant embodiment, the element 1 may furthermore comprise an additional colored layer (not illustrated) arranged behind the pattern 13 so as to give the pattern 13 a color, in particular when it is illuminated.

Figure 7C:
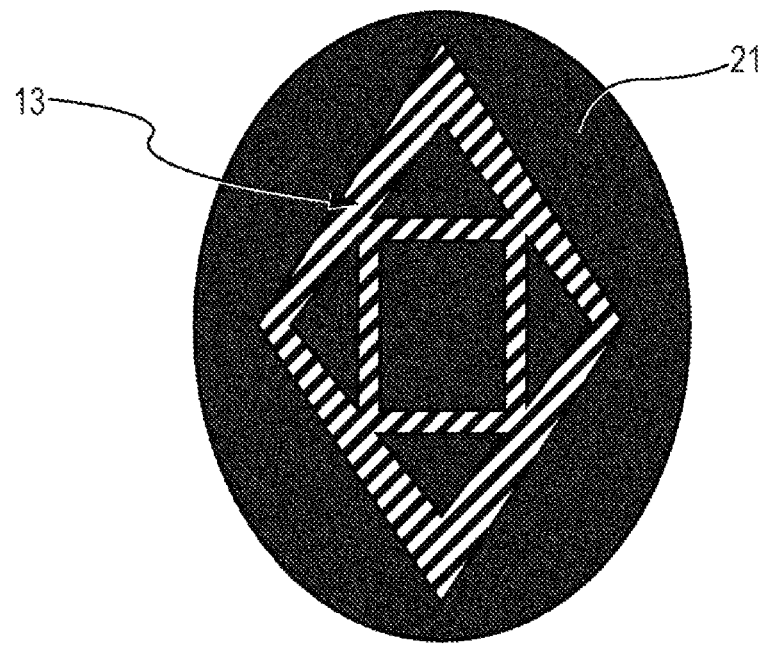
FIG. 7c illustrates a schematic view of a pattern produced in the reflective layer of said lighting element from FIG. 3 or FIG. 5, according to a third non-limiting embodiment.

Thus, in a second non-limiting embodiment illustrated in FIG. 7c, the pattern 13 is formed by the reflective layer 11. In one non-limiting variant embodiment, a mask 21 is affixed directly to the reflective layer 11. Thus, when the two light sources 10 are turned on, the light passes through the pattern 13, and the latter has a mirror appearance.

Figure 7D:
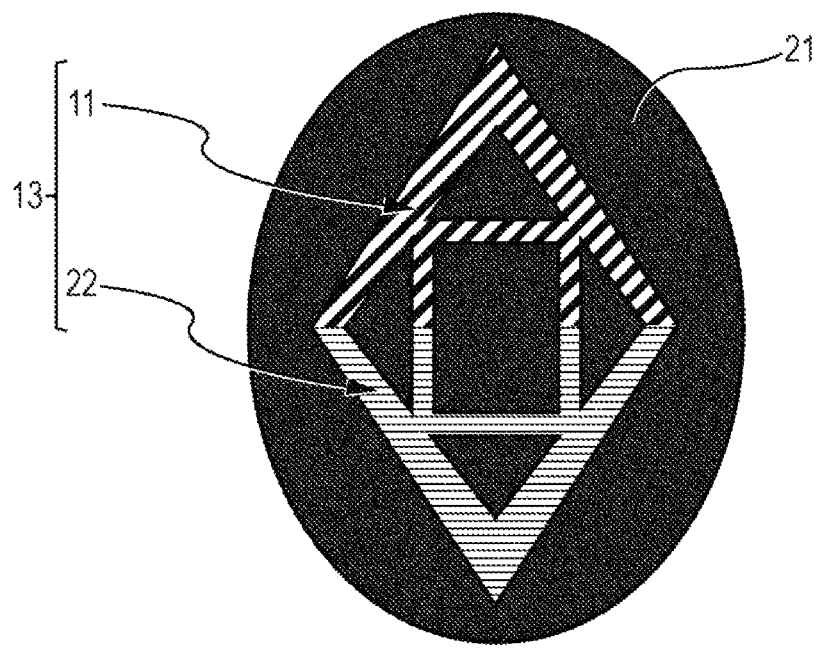
FIG. 7d illustrates a schematic view of a pattern produced in the reflective layer of said lighting element from FIG. 3 or FIG. 5, according to a fourth non-limiting embodiment.

Thus, in a third non-limiting embodiment illustrated in FIG. 7d, the pattern 13 is formed partly by the reflective layer 11, and partly by a colored layer 22. In one non-limiting variant embodiment, a mask 21 is affixed directly to the reflective layer 11. Thus, when the two light sources 10 are turned on, the light passes through the pattern 13, and the latter has a mirror appearance over one part, and a colored appearance over the other part in the non-limiting example taken.

The optical element 14 is described below.

The optical element 14 is configured so as to project the light rays R1 from the two light sources 10 through the reflective layer 11.

In a first non-limiting embodiment illustrated in FIG. 1, the optical element 14 is formed of prisms 141 and micro-prisms 140. The optical element 14 is located between the light source 10 and the dark layer 15. The prisms 141 make it possible to reorient the light rays R1 toward the center of the lighting element 1. The micro-prisms 140 make it possible to diffuse the light rays R1 in the direction of and through the reflective layer 11, and in particular the pattern 13. The size of the micro-prisms 140 is chosen so as not to interfere with the radar waves R2. In one non-limiting exemplary embodiment, the size is equal to the wavelength of the medium containing the micro-prisms 140 divided by 10. In one non-limiting example, the size is approximately 275 µm (micrometers) for a wavelength of 2.75 mm and a frequency of 77 GHz. In this first embodiment, in order to allow the light rays R1 to pass, the dark layer 15 comprises two apertures 150 provided for this purpose. Each prism 141 is arranged facing an aperture 150. Each light source 10 is arranged facing an aperture 150. Of course, in another non-limiting embodiment, the optical element 14 may be formed only of prisms 141.

In a second non-limiting embodiment illustrated in FIGS. 3 to 6, the optical element 14 is a light guide. In one non-limiting variant embodiment, the light guide 14 extends along the reflective layer 11 on a side opposite the side 11a of the reflective layer 11, the side 11a being visible to an observer. The light guide 14 thus comprises a side 14a (illustrated in FIG. 8b) facing the side 11b of the reflective layer 11.

Figure 3:
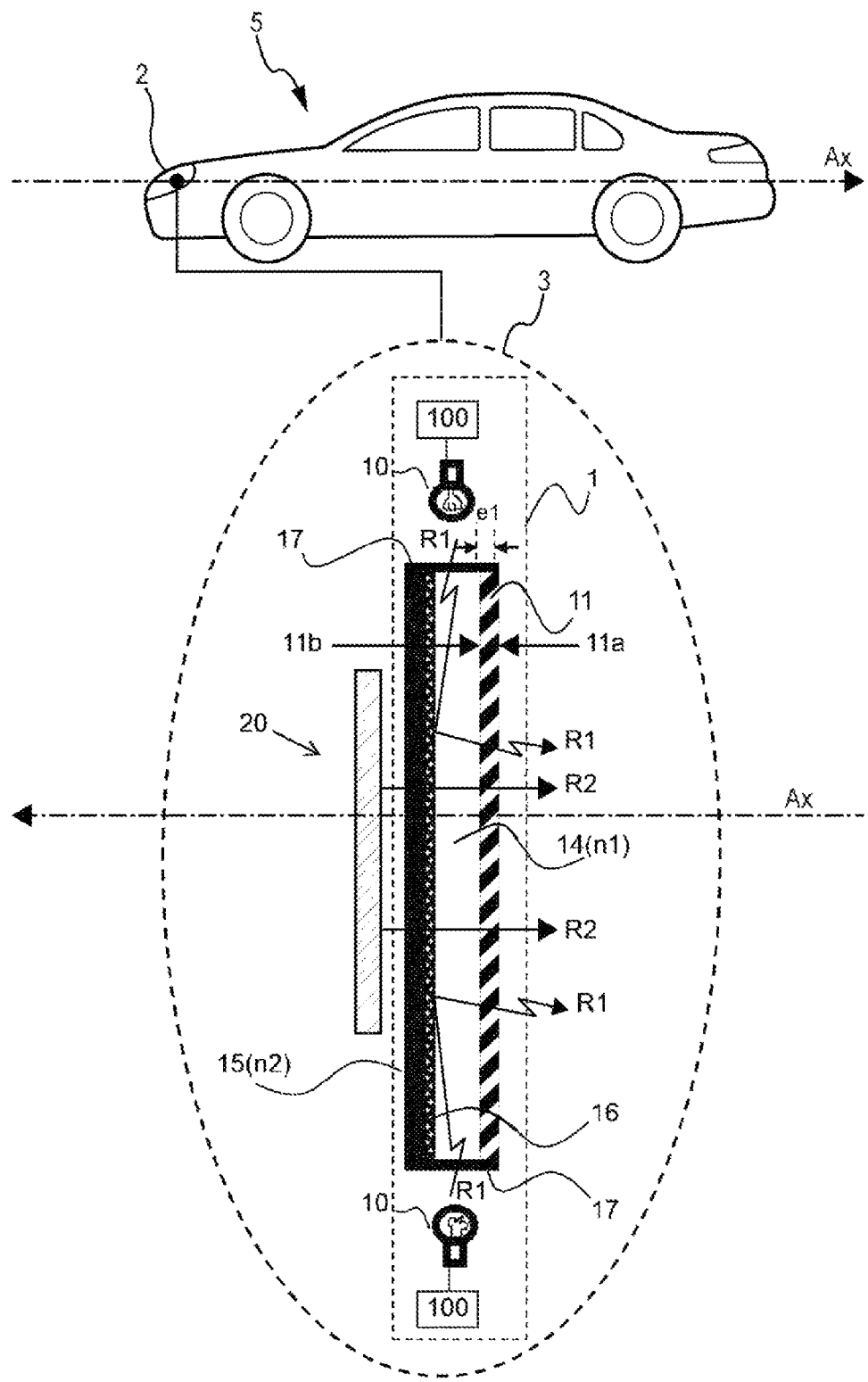
FIG. 3 is a schematic profile view of a lighting element comprising at least one light source, a reflective layer in which a pattern is formed, an optical element, a graining and a dark layer, when said at least one light source is turned on, according to a third non-limiting embodiment of the invention.
Figure 4:
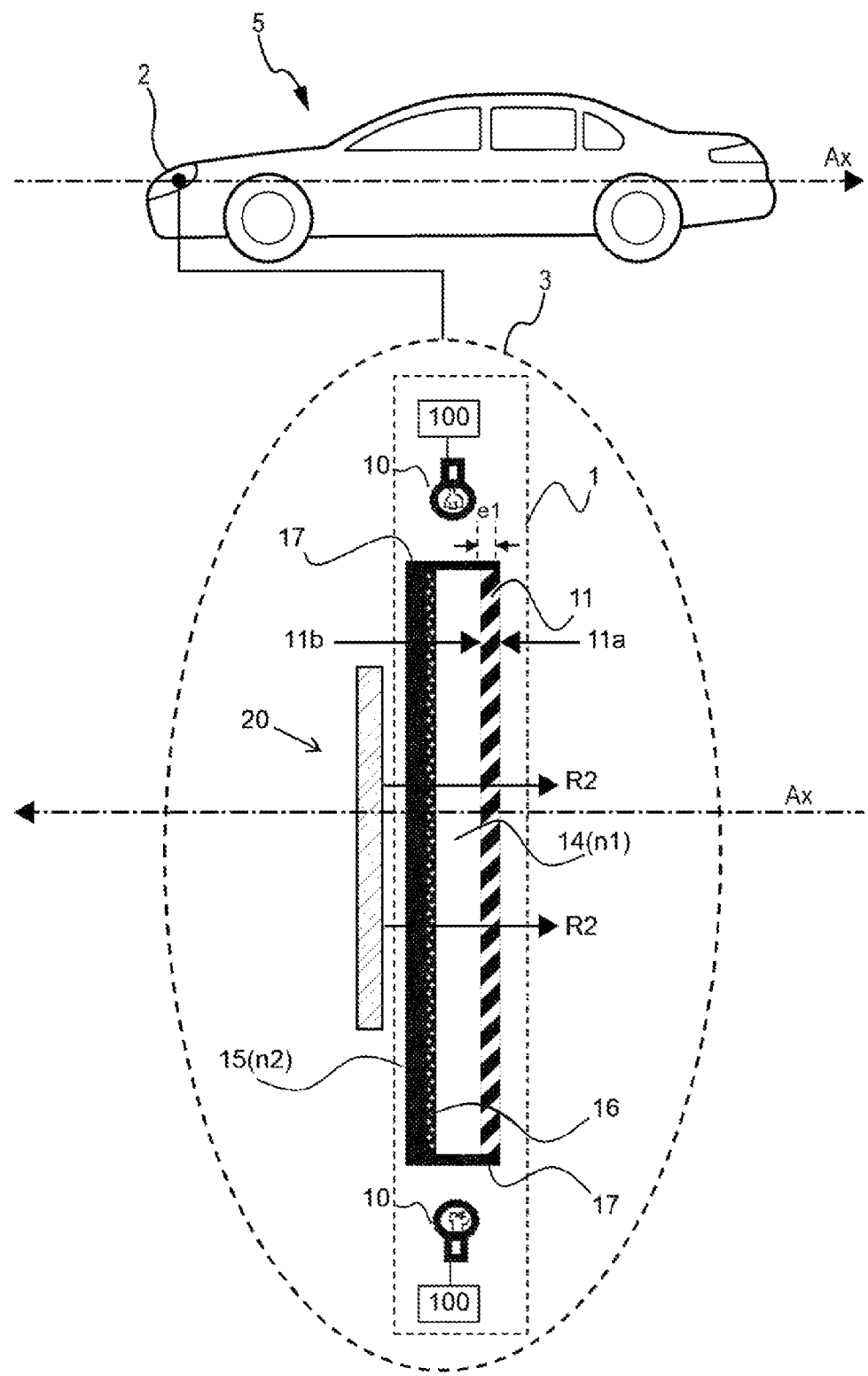
FIG. 4 is a schematic profile view of said lighting element from FIG. 3 when said at least one light source is turned off, according to the third non-limiting embodiment.

In a first non-limiting variant embodiment illustrated in FIG. 3 and FIG. 4, the light guide 14 is attached to the reflective layer 11 and to the dark layer 15.

Figure 5:
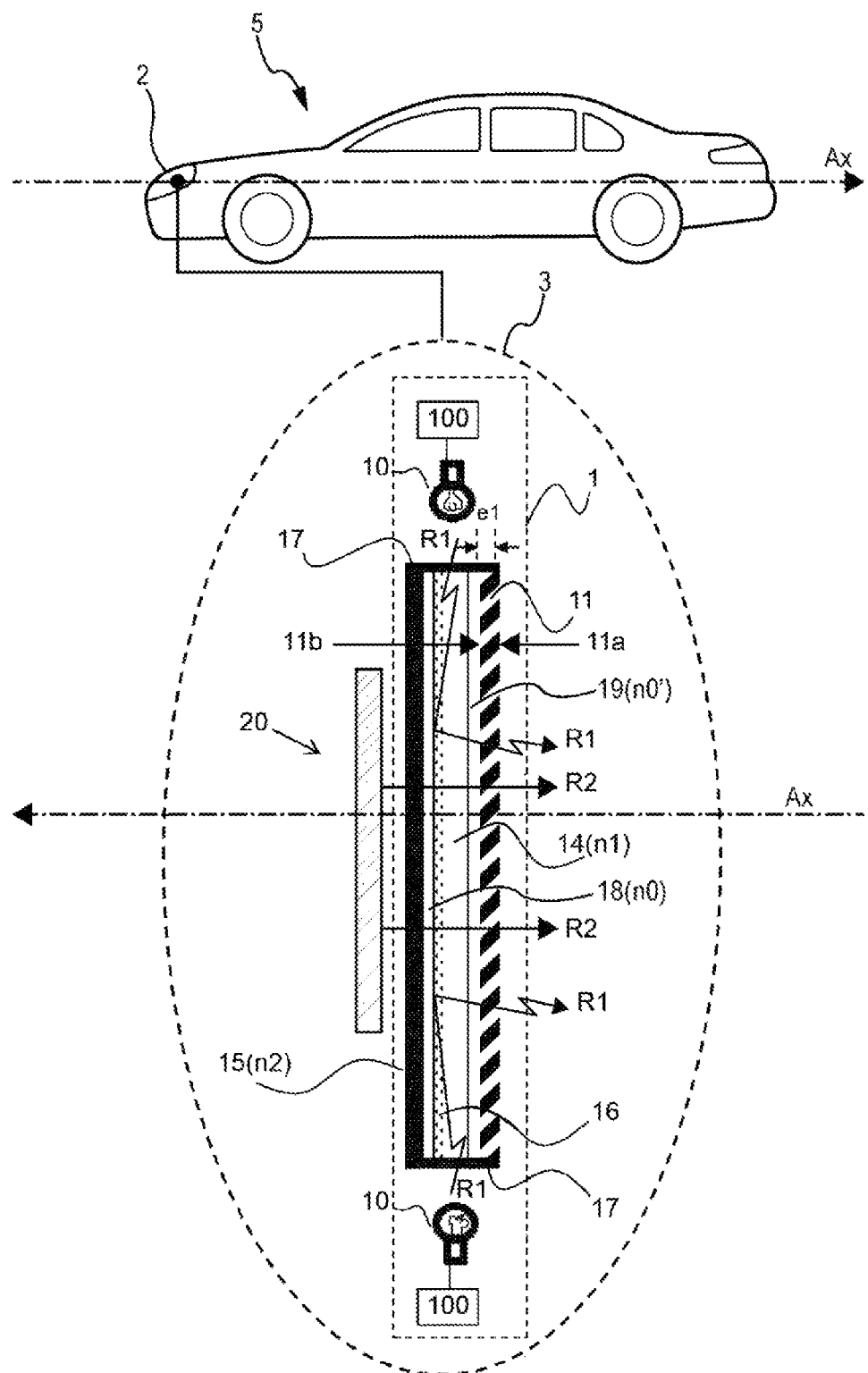
FIG. 5 is a schematic profile view of a lighting element comprising at least one light source, a reflective layer in which a pattern is formed, an optical element, a graining and a dark layer, when said at least one light source is turned on, according to a fourth non-limiting embodiment of the invention.
Figure 6:
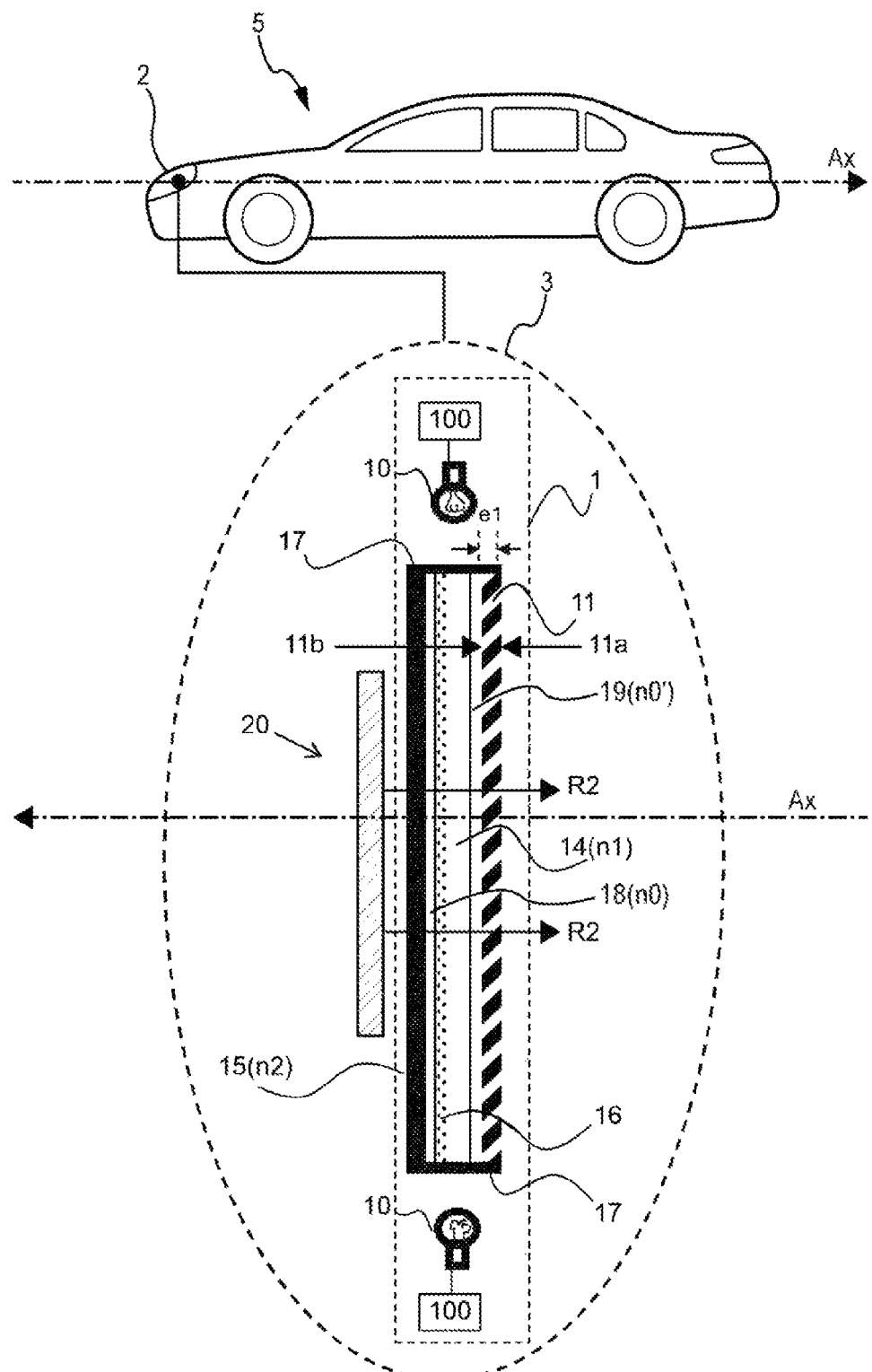
FIG. 6 is a schematic profile view of said lighting element from FIG. 3 when said at least one light source is turned off, according to the fourth non-limiting embodiment.

In a second non-limiting variant embodiment illustrated in FIG. 5 and FIG. 6, the light guide 14 is separated from the dark layer 15 by a primary medium 18 with a refractive index n0 lower than its own n1. In the same way, the light guide 14 is separated from the reflective layer 11 by a secondary medium 19 with a refractive index n0' lower than its own n1. In one non-limiting embodiment, the primary medium 18 and the secondary medium 19 are one and the same medium. In one non-limiting example, said primary medium 18 and said secondary medium 19 are air. As may be seen in FIG. 8b, the light guide 14 comprises two diopters Vc and Vd and a refractive index n1. Since the light guide 14 is adjacent to the medium 18, there is a change in refractive index upon passing through the diopter Vd. It changes from n0 to n1, n0 being the refractive index of air in the non-limiting example taken. This makes it possible to increase the efficiency of the transfer of the light rays R1 to the reflective layer 11. This reduces the absorption of a portion of the light rays R1 by the dark layer 15.

In addition, since the light guide 14 is adjacent to the medium 19, there is a change in refractive index upon passing through the diopter Vc. It changes from n1 to n0' (as illustrated in FIGS. 5, 6 and 8b). This makes it possible to improve the forward diffusion of light, specifically in the direction of and through the reflective layer 11.

In a third non-limiting variant embodiment, not illustrated, the light guide 14 is separated from the reflective layer 11 only by a secondary medium 18 with a refractive index n0 lower than its own n1.

The dark layer 15 is described below.

In one non-limiting embodiment, the dark layer 15 extends along said light guide 14 on a side opposite the reflective layer 11. It comprises a side 15a (illustrated in FIG. 8a) facing the side 14b of the optical element 14. In one non-limiting embodiment, the dark layer 15 comprises a length approximately equal to the length of the optical element 14. The dark layer 15 is located behind the reflective layer along the transverse axis Ax.

Figure 10:
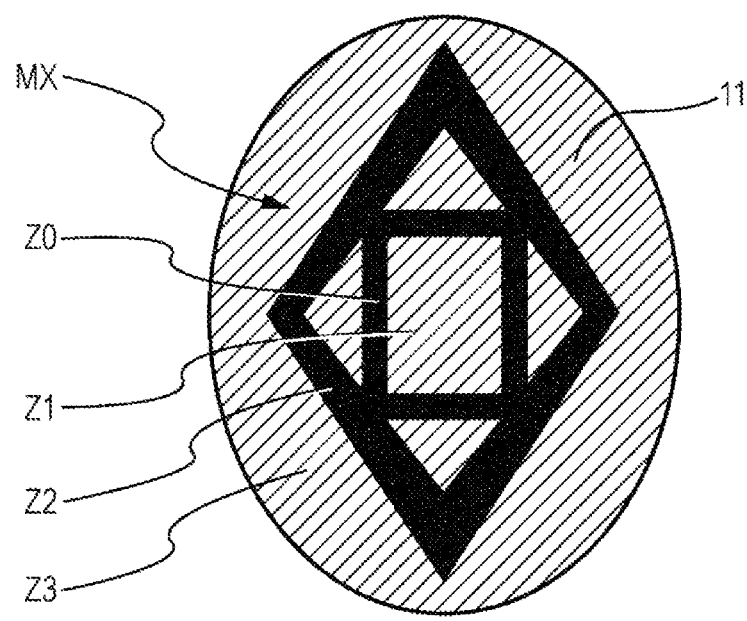
FIG. 10 illustrates a schematic front-on view of said lighting element from FIG. 4 or from FIG. 6, when said at least one light source is turned off, according to one non-limiting embodiment.

In one non-limiting embodiment, the dark layer 15 is semi-opaque or opaque 15. By virtue of the dark layer 15, the reflective layer 11 has a reflective appearance MX when the two light sources 10 are turned off, as illustrated in FIG. 10. Specifically, if looking along the through-axis Ax of the motor vehicle 5, the dark layer 15 is located behind the reflective layer 11. Without the dark layer 15, the reflective layer 11 would be translucent and would not have this reflective appearance, and the pattern 13 appears dark (in the case of a laser-etched pattern 13). This FIG. 10 applies to the embodiment illustrated in FIGS. 3 to 6.

Figure 9:
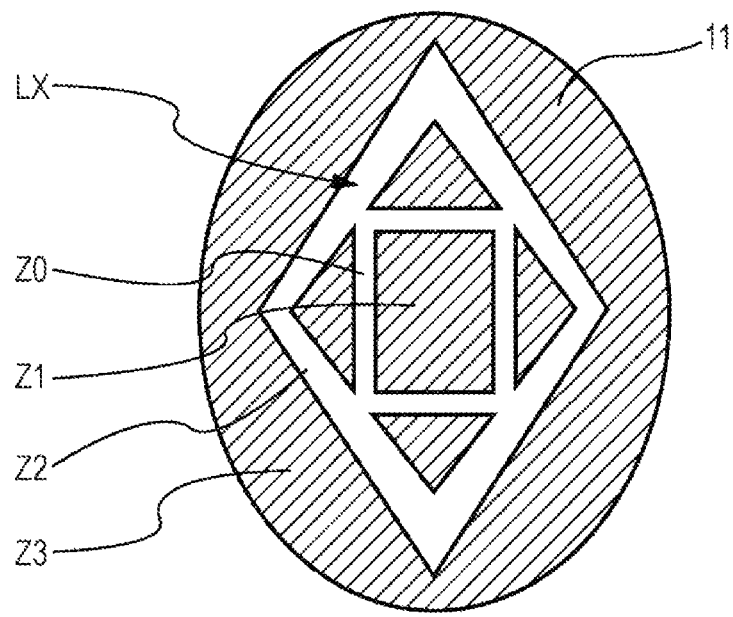
FIG. 9 illustrates a schematic front-on view of said lighting element from FIG. 3 or from FIG. 5, when said at least one light source is turned on, according to one non-limiting embodiment.

When the two light sources 10 are turned on, the reflective layer 11 appears clear in the non-limiting example illustrated in FIG. 9, and the pattern 13 appears white (in the case of a laser-etched pattern 13). This figure applies to the embodiment illustrated in FIGS. 3 to 6.

In a first non-limiting embodiment, the dark layer 15 is made of black polycarbonate. In a second non-limiting embodiment, it is a dark paint that covers the side 14b of the light guide 14 opposite the reflective layer 11.

Figure 8A:
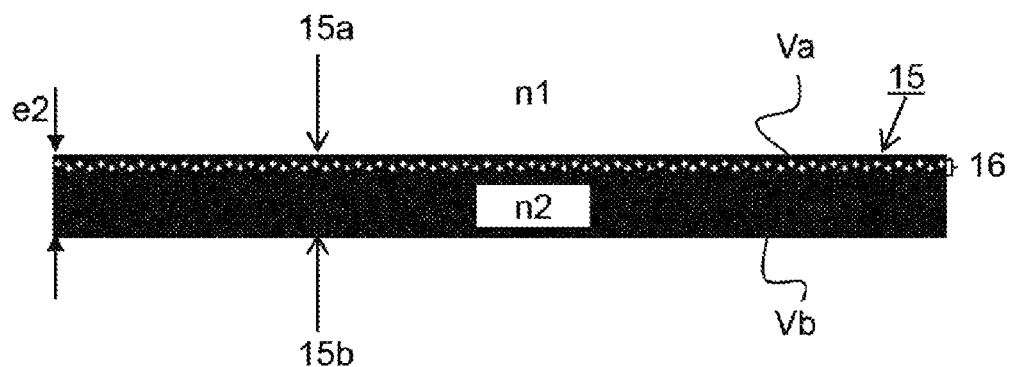
FIG. 8a illustrates a zoomed-in schematic profile view of the dark layer from FIG. 3 or from FIG. 4, the dark layer comprising said graining, according to a first non-limiting embodiment.
Figure 8B:
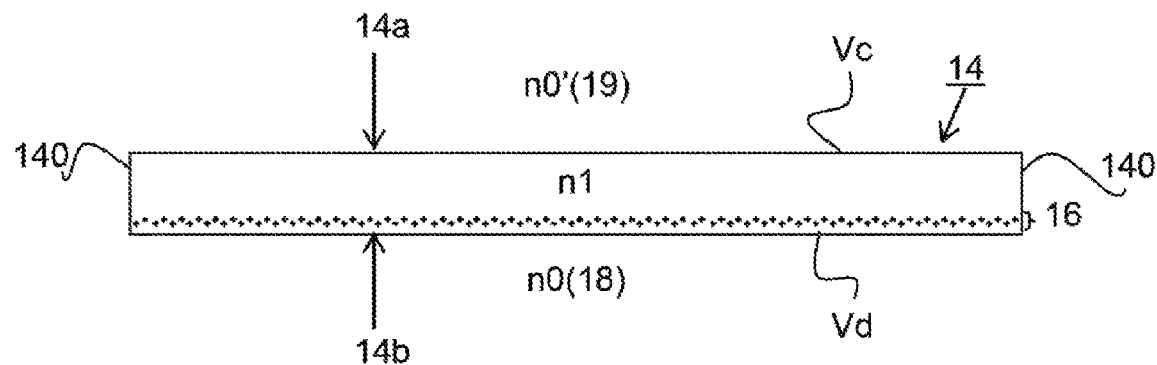
FIG. 8b illustrates a zoomed-in schematic profile view of the optical element from FIG. 5 or from FIG. 6, the optical element comprising said graining, according to a second non-limiting embodiment.

As illustrated in FIG. 8a, in one non-limiting embodiment, the dark layer 15 comprises a thickness e2 (illustrated in FIG. 8a) defined such that the radar waves R2 are not blocked by this dark layer 15. The dark layer 15 is thus as transparent as possible to the radar waves R2.

In one non-limiting embodiment, the element 1 furthermore comprises a graining 16 configured so as to diffuse the light rays R1 in the direction in particular of said pattern 13. The graining 16 is illustrated in FIGS. 3 to 6. In one non-limiting embodiment, the graining is produced using a laser method well known to those skilled in the art.

The graining 16 is formed of diffusive particles. The size of the diffusive particles is strictly less than the wavelength λ of the radar waves R2, specifically of the order of a micrometer (µm). The radar waves R2 thus propagate through the element 1 without being diffused by the graining 16.

In one non-limiting embodiment, the diffusion produced by the graining 16 follows the Rayleigh regime. This thus gives (Rayleigh regime—mx) strictly less than 1, where m=ni/nm, and ni is the index of the medium, and nm is the index of the diffusive particles of the graining 16, and x=2π*nm*a/λ, and a is the size of a diffusive particle of the graining 16.

In a first non-limiting embodiment illustrated in FIGS. 3, 4 and 8a, the graining 16 is located on the dark layer 15. In this case, in one non-limiting variant embodiment, the dark layer 15 is adjacent to the light guide 14. In other words, the dark layer 15 is attached to the light guide 14. As may be seen in FIG. 8a, the dark layer 15 comprises two diopters Va and Vb and a refractive index n2. Since the dark layer 15 is adjacent to the light guide 14, there is a change in refractive index upon passing through the diopter Va. It changes from n2 to n1. The combination of the graining 16 and the change in refractive index facilitates the diffusion of the light rays R1 toward the reflective layer 11. Without the graining 16, the light rays R1 would be reflected without leaving the light guide 14. Without the change in refractive index, the light rays R1 would be absorbed by the graining 16 without reflection.

In a second non-limiting embodiment illustrated in FIGS. 5, 6 and 8b, the graining 16 is produced on the light guide 14. In a first non-limiting variant embodiment, not illustrated, the graining 16 covers the entire surface of the light guide 14. In a second non-limiting variant embodiment that is illustrated, the graining 16 covers part of the light guide 14. This part is the side 14b of the light guide 14 facing the dark layer 15. The light rays R1 diffused by the light guide 14 are diffused by the graining 16 in the direction of the reflective layer 11. Without the graining 16, the light rays R1 would remain in the light guide 14.

Thus, by virtue of the lighting element 1 described above, as illustrated in FIG. 9, when the two light sources 10 are turned on (therefore generally at night), the light rays R1 from the two light sources 10 pass through the reflective layer 11 so as to illuminate the pattern 13. The light LX (formed by the light rays R1 from the two light sources 10) thus passes through the pattern 13, and is thus visible to an observer from outside the motor vehicle 5. The pattern 13 thus appears luminous. It is a pattern 13 that is luminous. The regions Z1 and Z3, which are regions different from the cut-out regions 130 forming the pattern 13, are regions of the reflective layer 11 that appear illuminated in this case. Of course, if there is an additional colored layer arranged behind the pattern 13, the latter will appear luminous with a color. Of course, if there is a dark mask behind the reflective layer 11 and in front of the light guide 14 (outside the pattern 13), the reflective layer 11 (outside the pattern 13) will appear dark at night.

Thus, as illustrated in FIG. 10, when the two light sources 10 are turned off (therefore generally during the day), there is no light that passes through the reflective layer 11. The pattern 13 formed in said reflective layer 11 is thus not illuminated. The reflective layer 11 outside the pattern 13 has a reflective appearance MX when it is observed by an observer from outside the motor vehicle 5 by virtue of the dark layer 15 located behind it. The regions Z1 and Z3 of the reflective layer 11 have a reflective appearance MX. Thus, during the day, this reflective appearance MX is clearly visible. The regions Z0 and Z2, which are cut-out regions 130 forming the pattern 13, appear dark by virtue of the dark layer 15 located behind the reflective layer 11 in this case. Of course, if there is an additional colored layer arranged behind the pattern 13, the latter will appear colored.

Of course, the description of the invention is not limited to the embodiments described above and to the field described above. Thus, in one non-limiting embodiment, the graining 16 as a whole has a shape that follows the shape of the pattern 13. Thus, in one non-limiting embodiment, the pattern 13 may appear luminous with a color by way of a color light source 10 instead of an additional colored layer. Thus, in another non-limiting embodiment, the lighting element 1 may comprise a graining 16 and an optical element 14 formed of prisms 141.

The described invention thus has in particular the following advantages:
- it allows light to pass through the pattern 13 regardless of the electro-optical setup of the light source 10; it is thus possible to illuminate through the pattern 13 instead of illuminating it all around,
- it makes it possible to have a low thickness e1 of a reflective layer 11 so as to block the radar waves R2 as little as possible, while still keeping the reflective appearance MX of this reflective layer 11 when the light source 10 is turned off, and to do so by virtue of using the dark layer 15 in combination with the reflective layer 11,
- it makes it possible to have a reflective layer 11 that allows light to pass when the light source 10 is turned on, while still having a mirror effect (clearly visible during the day) when the light source 10 is turned off,
- it makes it possible to integrate a light signature into a headlight, a vehicle tail light, or any other part of the vehicle (grille, trunk, etc.), which signature may be a manufacturer logo or the like,
- it makes it possible to give motor vehicle manufacturers other stylistic signature design options.

What is claimed is:

1. A lighting element for being arranged with a radar unit in a vehicle, the lighting element comprising:
    at least one light source configured so as to emit light rays,
    a reflective layer configured to allow radar waves of the radar unit to pass with a pattern being produced fully or partly by the reflective layer,
    an optical element configured so as to project the light rays from the at least one light source in the direction of the reflective layer, and
    a dark layer adapted to absorb light directed from an exterior and that extends along the optical element on a side opposite the reflective layer.

2. The lighting element as claimed in claim 1, wherein the lighting element further includes a graining.

3. The lighting element as claimed in claim 2, wherein the graining is included on the dark layer.

4. The lighting element as claimed in claim 2, wherein said graining is included on the optical element.

5. The lighting element as claimed in claim 1, wherein the optical element is a light guide or is formed of prisms.

6. The lighting element as claimed in claim 1, wherein the dark layer is semi-opaque or opaque.

7. The lighting element as claimed in claim 1, wherein the reflective layer is made of silicon oxide or titanium.

8. The lighting element as claimed in claim 1, wherein the reflective layer includes a thickness in the order of a nanometer.

9. The lighting element as claimed in claim 1, wherein the pattern is produced by laser etching in the reflective layer and formed fully or partly by the reflective layer.

10. The lighting element as claimed in claim 1, wherein the lighting element includes two light sources.

11. The lighting element as claimed in claim 10, wherein the two light sources are arranged on either side of the optical element.

12. The lighting element as claimed in claim 10, wherein the two light sources are arranged facing the dark layer on a side opposite the reflective layer.

13. The lighting element as claimed in claim 1, wherein the reflective layer is made of indium.

14. The lighting element as claimed in claim 1, wherein the optical element is formed of prisms and micro-prisms.

15. A lighting assembly for being arranged with radar in a vehicle, the light assembly comprising:
    a lighting element, the lighting element including,
        at least one light source configured so as to emit light rays,
        a reflective layer formed from a metalized composition made of indium, silicon oxide or titanium that is configured to allow radar waves to pass with a pattern being produced fully or partly by the reflective layer,
        an optical element configured so as to project the light rays from the at least one light source in the direction of the reflective layer,
        a dark layer including a graining adapted to absorb light directed from an exterior and that extends along the optical element on a side opposite the reflective layer.

* * * * *